United States Patent Office 3,450,118
Patented June 17, 1969

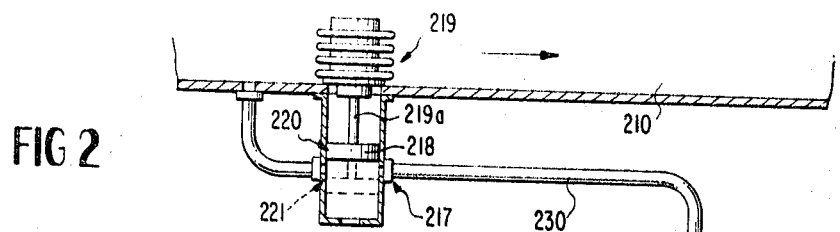
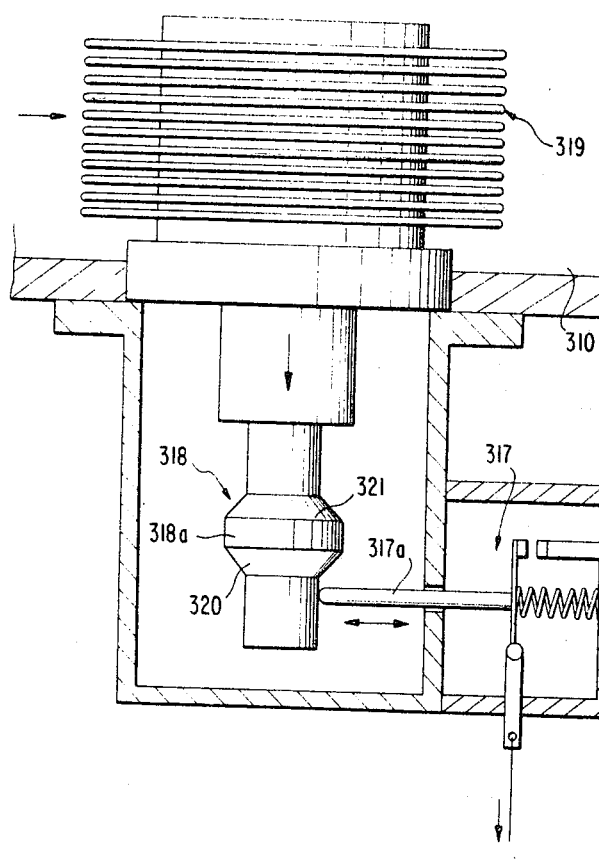

3,450,118
INSTALLATION FOR HEATING THE PRECOMPRESSED COMBUSTION AIR IN INTERNAL COMBUSTION ENGINES
Herbert Lebig, Stuttgart, Germany, assignor to Daimler-Benz Aktiengesellschaft, Stuttgart-Unterturkheim, Germany
Filed Apr. 21, 1967, Ser. No. 632,810
Claims priority, application Germany, Apr. 22, 1966, D 49,917
Int. Cl. F02m 31/02; F02n 17/02
U.S. Cl. 123—122
23 Claims

ABSTRACT OF THE DISCLOSURE

An installation for heating the precompressed combustion air in internal combustion engines in which heat is transferred to the heat-transfer fluid in a first heat-exchanger and heat is given off by the heat-transfer fluid to the combustion air in a second heat-exchanger, and in which the heat-transfer fluid is supplied to the second heat-exchanger controlled by a control device in dependence on a variable magnitude whereby the control device is connected with a measuring device measuring the temperature of the precompressed combustion air, and the second heat-exchanger is in effect closed to the heat-transfer fluid above a minimum temperature of the precompressed combustion air; the second heat-exchanger may again be opened to the heat-transfer fluid above a preselected maximum temperature.

Background of the invention

Figure 1:
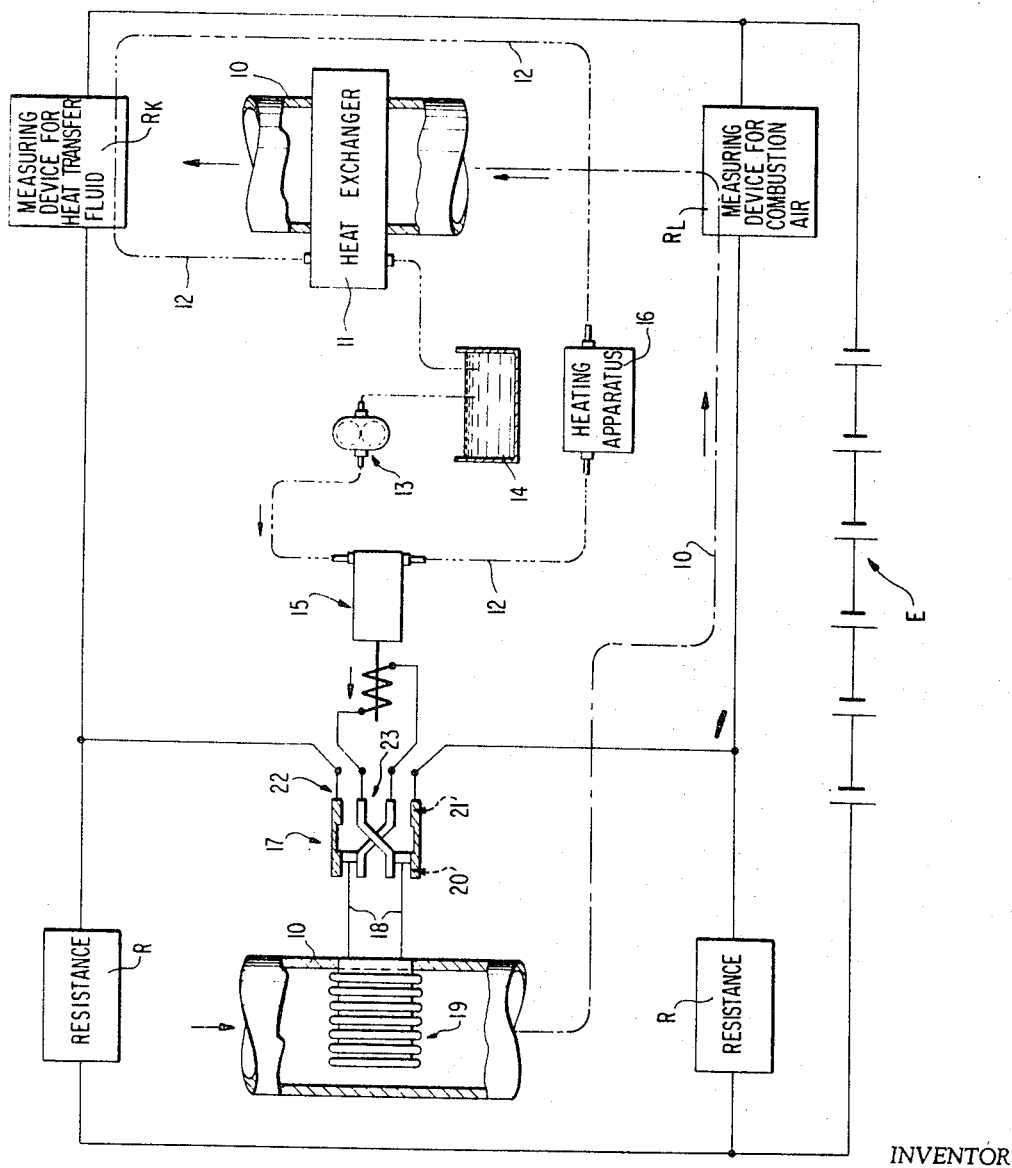

The present invention relates to an installation for heating the precompressed combustion air in internal combustion engines, having a first heat-exchanger for the heat absorption of the heat-transfer fluid and a second heat-exchanger for the heat transfer or transmission to the precompressed combustion air, and in which the heat-transfer fluid is supplied to the second heat-exchanger by a control device in dependence on a variable magnitude, as described in the co-pending application Ser. No. 14,059, field on Dec. 15, 1965 now Patent No. 3,397,684, and assigned to the same assignee as the present application. The contents of the co-pending application are incorporated herein by reference to the extent necessary.

Summary of the invention

The purpose underlying the present invention essentially consists in improving an installation as mentioned above and described in the aforementioned co-pending application. For this purpose, provision is made according to the present invention that the control device is operatively connected with a measuring installation for the temperature of the precompressed combustion air and the second heat-exchanger is blocked for or closed to the heat-transfer fluid above a predetermined, preselected minimum temperature of the precompressed combustion air. The advantage is achieved by the present invention that the heating of the combustion air is undertaken only when with the low air temperatures—for example, during idling or starting of the internal combustion engine—the danger of ignition difficulties exists. Additionally, the present invention avoids that the combustion air is preheated to such a high extent that the thermal load of the internal combustion engine assumes critical values.

According to a further feature of the present invention, provision is made that heat-transfer fluid is supplied to the second heat-exchanger exclusively with temperature of the heat-transfer fluid above the prevailing temperature of the precompressed combustion air. It is assured by this measure that the combustion air will not be cooled by the heat-transfer fluid of variable temperature precisely at that time when, for example, during the starting operation or idling of the internal combustion engine, a heating of the precompressed combustion air is desired.

If the cooling medium for the cooling system of the internal combustion engine is utilized as heat-transfer fluid, then according to a further feature of the present invention, the control device can be brought exclusively into that position within the range between the minimum temperature and a further preselected maximum temperature of the precompressed combustion air, in which the heat-exchange of the precompressed combustion air by the influence of the heat-transfer fluid is effectively blocked or precluded. It is achieved thereby that the heat-transfer fluid is supplied continuously to the heat-exchanger for the precompressed combustion air except within the range between the minimum and maximum temperature. In other words, the combustion air will be preheated only when its temperature is lower than the minimum temperature pre-selected in relation to the idling rotational speed or a critical atmospheric temperature; a cooling off of the combustion air takes place only when the temperature is higher than the maximum temperature preselected in relation to a maximum cooling medium temperature.

According to a still further feature and development of the present invention, the control device of the first order for the heat-exchange of the precompressed combustion air may be actuatable by an auxiliary control force, and a control device of second order for the auxiliary control force may cooperate with the measuring installation for the temperature of the precompressed combustion air.

In a first embodiment of the installation according to the present invention, the measuring installation for the temperature of the precompressed combustion air may include a movable cam member which cooperates with the control device of the second order for the auxiliary control force.

A second embodiment of the installation for heating the combustion air according to the present invention is characterized by the fact that the measuring installation for the temperature of the precompressed combustion air is operatively connected either directly or indirectly with the movable valve body of a pressure medium valve for the auxiliary control force.

In a preferred embodiment of the installation according to the present invention, the control device of the first order for the heat-exchange of the precompressed combustion air is adapted to be shifted between a first end position blocking the heat-transfer fluid and a second end position releasing the heat-transfer fluid for the heat-exchange. The control device may thereby be movable into or may be retained in one of the end positions in an advantageous manner by means of a spring force.

Accordingly, it is an object of the present invention to provide an installation for the heating of the precompressed combustion air of internal combustion engines of the type described above which eliminates by simple means the aforementioned shortcomings and drawbacks encountered with the prior art constructions.

Another object of the present invention resides in an installation for heating the precompressed combustion air in internal combustion engines which not only further improves the control efficacy but assures heating of the combustion engine only when required.

A further object of the present invention resides in an installation for heating the precompressed combustion air in internal combustion engines which reliably precludes preheating of the combustion air to such an extent as might cause thermal overloading of the internal combustion engines.

Still a further object of the present invention resides in an installation for heating the precompressed combustion air of internal combustion engines which precludes cooling off of the combustion air by the heat-transfer fluid under those operating conditions which would normally require a heating thereof.

Another object of the present invention resides in a control installation for heating the precompressed combustion air of internal combustion engines which preheats the combustion air only when its temperature is smaller than a preselected minimum temperature and cools off the combustion air only when the temperature thereof is higher than a preselected maximum temperature.

These and other objects, features, and advantages of the present invention will become more obvious from the following description when taken in connection with the accompanying drawing which shows, for purposes of illustration only, several embodiments in accordance with the present invention, and wherein:

FIGURE 1 is a schematic view of an installation for heating and cooling the precompressed combustion air by means of a common heat-transfer fluid according to the present invention in which the heat-transfer fluid is effective below a minimum temperature of the combustion air as regards to the latter only when the temperature of the heat-transfer fluid is higher than the prevailing temperature of the air to be heated;

FIGURE 2 is a schematic cross-sectional view through one embodiment of an installation for heating and cooling the combustion air in which, for purposes of simplification of the installation, the heat-transfer fluid is effective below the minimum temperature of the combustion air with respect to the combustion air also when its temperature is smaller than the temperature of the air to be heated; and FIGURE 3 is a schematic cross-sectional view through a modified embodiment of an installation, similar to FIG. 2, for heating and cooling the combustion air according to the present invention.

Referring now to the drawing wherein corresponding reference numerals are used throughout the various views to designate like parts, and more particularly to FIGURE 1, a heat-exchanger 11 of any conventional construction is arranged in the common supply line or conduit 10 of the precompressed combustion air leading to the combustion spaces of the internal combustion engine (not shown). The heat-exchanger 11 is connected with a cooling-medium line 12 which establishes a cooling medium circulation between a cooling medium pump generally designated by reference numeral 13 and a container or tank 14 for the cooling medium. An electromagnetic valve generally designated by reference numeral 15 and of any conventional construction, which constitutes a control device of the first order, and a heating apparatus 16 of any conventional construction are arranged in the cooling medium line 12 between the heat-exchanger 11 and the pump 13. The heating apparatus 16 may be analogous to similar apparatus as disclosed in the aforementioned co-pending application.

Furthermore, a measuring installation is provided in the cooling-medium line 12 which essentially consists of an electrical resistance $R_K$ which changes with the temperature of the cooling medium. A further measuring installation is arranged in the line 10 of the precompressed combustion air which essentially consists of an electrical resistance $R_L$ that changes with the temperature of the combustion air. The resistances $R_K$ and $R_L$ which are of any conventional construction, are connected in parallel with a conventional source of voltage generally designated by reference character E and form together with one resistance R each connected in series therewith, a type of "Wheatstone bridge" in which the difference of the currents flowing as a result of the variable resistances are made effective with respect to the electromagnetic valve 15. The valve 15 is adapted to be shifted between one end position in which the line 12 is opened up and another end position in which the line 12 is closed or blocked. The movable valve body of the valve 15 is retained in or moved into the end position opening the line 12 by a spring force. The valve body of the valve 15, on the other hand, is actuated into the other end position, i.e., in which the line 12 is closed, by the electromagnet thereof of conventional construction.

A control device generally designated by reference numeral 17 of the second order for the current difference acting on the control valve 15 is arranged between the electromagnetic valve 15 and the resistances R, $R_K$, and $R_L$ of the Wheatstone bridge. The movable control part 18 of the control device 17 is operatively connected with a measuring installation generally designated by reference numeral 19 for the temperature of the precompressed combustion air in the supply line and is adapted to be displaced between a first shifting position indicated at 20 and a second shifting position indicated at 21. A preselected minimum temperature of the combustion air corresponds to the shifting position 20 of the control valve 18 whereas the shifting position 21 of the control valve 18 corresponds to a preselected maximum temperature of the precompressed combustion air. The fixed control part of the control device 17 generally designated by reference numerals 22 and 23 is so constructed and arranged that the electromagnet of the control valve 15 only responds when, on the one hand, in the shifting position 20 of the control valve 18 the temperature of the precompressed combustion air is lower than the temperature of the cooling medium or the resistance $R_L$ is smaller than the resistance $R_K$—and, on the other hand, in the shifting position 21 of the control part 18, the temperature of the cooling medium or the resistance $R_L$ is larger than the resistance $R_K$.

According to FIGURE 2, in which similar reference numerals of the 200 series are used to designate parts corresponding to those of FIGURE 1, a measuring device generally designated by reference numeral 219 for the temperature of the combustion air is arranged in the common supply line 210 of the precompressed combustion air. The measuring device 219 acts by way of a linkage 219a on the movable valve body 218 of a control valve generally designated by reference numeral 217. The control valve 217 is arranged in a pressure medium line 230 which, on the one hand, is connected with the supply line 210, and, on the other, with a pressure medium cylinder 231. The working piston 232 of the pressure medium cylinder 231 may be operatively connected in a motion-dependent manner with the movable valve body of that control valve (not shown) which controls the supply of the cooling medium to the heat-exchanger (not shown) of the supply line 210.

The movable valve body 218 can be displaced from the position 220 thereof shown in FIGURE 2, which corresponds to a preselected minimum temperature of the combustion air, into a position illustrated in dash line at 221 which corresponds to an also preselected maximum temperature of the combustion air. In the positions 220 and 221 of the valve body 218, the pressure medium cylinder 231 is connected with the line 210 whereas in the center positions of the valve body 218 (between the positions 220 and 221), the pressure medium cylinder 231 is connected with the atmosphere in a conventional manner. Exclusively, in the center positions of the valve body 218, the control device for the heat-exchanger of the precompressed combustion air which is operatively connected with the working piston 232, is brought or displaced into that position in which this heat-exchange is disabled or interrupted.

According to FIGURE 3, in which corresponding reference numerals of the 300 series are used to designate similar parts of FIGURE 1, a measuring device generally designated by reference numeral 319 for the temperature of the combustion air is arranged in the supply line 310 of the precompressed combustion air leading to the combustion spaces of the internal combustion engine (not shown). The measuring installation 319 is provided with a movable cam member generally designated by reference numeral 318 which actuates an electric switch element generally designated by reference numeral 317 for the electromagnet of an electromagnetic control valve (not shown) for the cooling medium. Depending on the position of the cam member 318, the current or energizing circuit between a conventional voltage supply 340 and the electromagnet (not shown) for the electromagnetic control valve of the cooling medium is either closed or opened.

The cam member 318 may assume a first position in which a first control edge 320 is in engagement with the spring-loaded actuating member 317a of the switch element 317 so that the aforementioned current circuit is closed and the electromagnetic control valve blocks the cooling medium for the heat-exchanger (not illustrated) in the line 310. A preselected minimum temperature of the precompressed combustion air corresponds to the first position of the cam member 318 described above.

The cam member 318 is able to assume a second position in which a second control edge 321 is brought into or out of engagement with the actuating member 317a. A preselected maximum temperature of the precompressed combustion air corresponds to this second position of the cam member 318. The control edges 320 and 321 delimit a cam surface 318a. Within that area of movement of the cam member 318 in which the surface 318a acts on the actuating member 317a of the switching element 317, the current circuit to the electromagnetic control valve is closed, i.e., within the temperature range between minimum and maximum temperature of the combustion air, the cooling medium for the combustion air is effectively blocked.

Except for the specific improvements disclosed herein, the installation may be as shown and described in the copending application with respect to the several figures thereof.

I claim:

1. An installation for heating the precompressed combustion air of internal combustion engines, comprising first heat-exchanger means for the heat transfer with respect to the heat-transfer medium, conduit means for conducting the precompressed combustion air to an engine, second heat-exchanger means operatively associated with said conduit means for heat transfer with respect to the precompressed combustion air, means operatively connecting said first heat-exchanger with said second heat-exchanger for conducting the heat-transfer fluid from said first heat-exchanger means to said second heat-exchanger means including control means operable in dependence on a variable magnitude for controlling the supply of the heat-transfer medium from said first heat-exchanger means to said second heat-exchanger means, measuring means for measuring the temperature of the precompressed combustion air and operatively connected with said control means in such a manner as to block the second heat-exchanger means to the heat-transfer medium above a preselected minimum temperature of the precompressed combustion air, and second measuring means for measuring the temperature of the heat transfer medium and operatively connected with said control means in such a manner as to open the second heat exchanger means to flow of the heat transfer medium exclusively at measured temperatures of the heat transfer medium above the temperature of the precompressed air.

2. An installation according to claim 1, wherein the cooling medium for the engine cooling system is used as said heat-transfer medium, said control means being rendered operable to effectively block the heat exchange of the precompressed combustion air by the influence of the heat-transfer medium substantially exclusively within the range between said minimum temperature and a further preselected maximum temperature of the precompressed combustion air.

3. An installation according to claim 2, wherein said control means includes a control device of the first order to selectively block and open the second heat exchanger means to said heat transfer medium for the heat-exchange of the precompressed combustion air, auxiliary control force means for controlling said first-mentioned control device, and a control device of the second order for controlling said auxiliary control force means and operatively responsive to the measuring means for the temperature of the precompressed combustion air.

4. An installation according to claim 3, wherein said measuring means for the temperature of the precompressed combustion air includes movable cam means cooperating with the control device of the second order for the auxiliary control force means.

5. An installation according to claim 3, wherein the measuring means for the temperature of the precompressed combustion air is operatively connected with a movable valve body of a pressure medium valve means for the auxiliary control force means.

6. An installation according to claim 5, wherein said measuring means is directly connected with said valve body.

7. An installation according to claim 5, wherein said measuring means is indirectly connected with said valve body.

8. An installation according to claim 3, wherein the control device of the first order for the heat-exchange of the precompressed combustion air is adapted to be shifted between a first end position in which the heat-transfer fluid is effectively blocked, and a second end position in which the heat-transfer fluid is effectively released for the heat-exchange.

9. An installation according to claim 8, further comprising spring force means urging the control device of the first order for the heat-exchange of the precompressed combustion air in one of the end positions thereof.

10. An installation according to claim 9, wherein said spring force means displaces the control device of the first order into said end position.

11. An installation according to claim 10, wherein said spring force means normally retains the control device of the first order in said one end position.

12. An installation according to claim 1, wherein the cooling medium for the engine cooling system is used as said heat-transfer medium, said control means being rendered operable to effectively block the heat exchange of the precompressed combustion air by the influence of the heat-transfer medium substantially exclusively within the range between said minimum temperature and a further preselected maximum temperature of the precompressed combustion air.

13. An installation according to claim 12, wherein said control means includes a control device of the first order to selectively block and open the second heat exchanger means to said heat transfer medium for the heat-exchange of the precompressed combustion air, auxiliary control force means for controlling said first-mentioned control device, and a control device of the second order for controlling said auxiliary control force means and operatively responsive to the measuring means for the temperature of the precompressed combustion air.

14. An installation according to claim 1, wherein the control device of the first order for the heat-exchange of the precompressed combustion air is adapted to be shifted between a first end position in which the heat-transfer fluid is effectively blocked, and a second end position in which the heat-transfer fluid is effectively relaased for the heat-exchange.

15. An installation according to claim 14, further comprising spring force means urging the control device of the first order for the heat-exchange of the precompressed combustion air in one of the end positions thereof.

16. An installation according to claim 15, wherein said spring force means displaces the control device of the first order into said end position.

17. An installation according to claim 15, wherein said spring force means normally retains the control device of the first order in said one end position.

18. An installation according to claim 1, wherein said control means includes a control device of the first order to selectively block and open the second heat exchanger means to said heat transfer medium for the heat-exchange of the precompressed combustion air, auxiliary control force means for controlling said first-mentioned control device, and a control device of the second order for controlling said auxiliary control force means and operatively responsive to the measuring means for the temperature of the precompressed combustion air.

19. An installation according to claim 18, wherein said measuring means for the temperature of the precompressed combustion air includes movable cam means cooperating with the control device of the second order for the auxiliary control force means.

20. An installation according to claim 18, wherein the measuring means for the temperature of the precompressed combustion air is operatively connected with a movable valve body of a pressure medium valve means for the auxiliary control force means.

21. An installation according to claim 18, further comprising spring force means urging the control device of the first order for the heat-exchange of the precompressed combustion air in one of the end positions thereof.

22. An installation according to claim 21, wherein said spring force means displaces the control device of the first order into said end position.

23. An installation according to claim 21, wherein said spring force means normally retains the control device of the first order in said one end position.

References Cited
UNITED STATES PATENTS

| | | | |
|---|---|---|---|
| 2,372,272 | 3/1945 | Helmore | 123—119 |
| 2,558,797 | 7/1951 | Theiss | 123—122 |
| 2,633,698 | 4/1953 | Nettel | 60—13 |

AL L. SMITH, *Primary Examiner.*

U.S. Cl. X.R.

123—142.5, 179